US012039979B2

(12) United States Patent
Gomes et al.

(10) Patent No.: US 12,039,979 B2
(45) Date of Patent: Jul. 16, 2024

(54) MULTIPLE CONCURRENT VOICE ASSISTANTS

(71) Applicant: GOOGLE LLC, Mountain View, CA (US)

(72) Inventors: Jonathan Hayden Gomes, San Diego, CA (US); Shashank Goel, Milpitas, CA (US); Oscar Armando Azucena, Mountain View, CA (US); Patrick Berny, Mountain View, CA (US); Keun-Young Park, Santa Clara, CA (US); Matthew William Crowley, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 272 days.

(21) Appl. No.: 17/722,213

(22) Filed: Apr. 15, 2022

(65) Prior Publication Data

US 2023/0335127 A1    Oct. 19, 2023

(51) Int. Cl.
*G10L 15/22*    (2006.01)
*G06F 3/14*    (2006.01)
(Continued)

(52) U.S. Cl.
CPC .............. *G10L 15/22* (2013.01); *G06F 3/14* (2013.01); *G06F 3/165* (2013.01); *G10L 15/16* (2013.01);
(Continued)

(58) Field of Classification Search
CPC ..... G10L 15/22; G10L 21/0208; G10L 15/30; G10L 2015/088; G10L 2021/02082;
(Continued)

(56) References Cited

U.S. PATENT DOCUMENTS

| | | | |
|---|---|---|---|
| 10,887,734 B2 * | 1/2021 | Dar | H04W 4/38 |
| 2014/0135952 A1 * | 5/2014 | Maehara | G05B 15/02 |
| | | | 700/90 |

(Continued)

FOREIGN PATENT DOCUMENTS

| | | |
|---|---|---|
| CN | 113593550 A | 11/2021 |
| WO | 2020025186 | 2/2020 |
| WO | 2022067345 A1 | 3/2022 |

OTHER PUBLICATIONS

European Patent Office; Invitation to Pay Additional Fees issued in Application No. PCT/US2022/052425; 15 pages; dated Apr. 28, 2023.

(Continued)

*Primary Examiner* — Mohammad K Islam
(74) *Attorney, Agent, or Firm* — Gray Ice Higdon

(57) ABSTRACT

Techniques are described herein for concurrent voice assistants. A method includes: providing first and second automated assistants with access to one or more microphones; receiving, from the first automated assistant, an indication that the first automated assistant has initiated a first session, and in response: continuing providing, to the first automated assistant, access to the one or more microphones; discontinuing providing, to the second automated assistant, access to the one or more microphones; and preventing the second automated assistant from accessing one or more portions of an output audio data stream; receiving, from the first automated assistant, an indication that the first session has ended, and in response: continuing providing, to the first automated assistant, access to the one or more microphones; resuming providing, to the second automated assistant, access to the one or more microphones; and resuming providing, to the second automated assistant, the output audio data stream.

20 Claims, 6 Drawing Sheets

(51) Int. Cl.
*G06F 3/16* (2006.01)
*G10L 15/08* (2006.01)
*G10L 15/16* (2006.01)
*G10L 15/30* (2013.01)
*G10L 21/0208* (2013.01)
*H04M 1/27* (2006.01)
*H04R 3/00* (2006.01)

(52) U.S. Cl.
CPC ......... *G10L 21/0208* (2013.01); *H04M 1/271* (2013.01); *H04R 3/00* (2013.01); *G10L 2015/088* (2013.01); *G10L 15/30* (2013.01); *G10L 2021/02082* (2013.01)

(58) Field of Classification Search
CPC ......... G10L 15/08; G10L 15/07; G10L 17/22; G06F 3/14; G06F 3/165; H04M 1/271; H04R 3/00; H04W 12/06; H04W 12/08
See application file for complete search history.

(56) References Cited

U.S. PATENT DOCUMENTS

| | | | | |
|---|---|---|---|---|
| 2017/0105095 | A1* | 4/2017 | Um | H04W 4/70 |
| 2017/0329572 | A1* | 11/2017 | Shah | G10L 15/28 |
| 2018/0033431 | A1* | 2/2018 | Newendorp | G10L 15/22 |
| 2018/0151180 | A1* | 5/2018 | Yehuday | G10L 15/24 |
| 2019/0066672 | A1* | 2/2019 | Wood | H04L 67/1014 |
| 2019/0206411 | A1* | 7/2019 | Li | H04L 12/282 |
| 2019/0215184 | A1* | 7/2019 | Emigh | H04L 12/282 |
| 2019/0251960 | A1* | 8/2019 | Maker | G10L 15/22 |
| 2020/0028734 | A1* | 1/2020 | Emigh | H04L 67/10 |
| 2020/0184964 | A1 | 6/2020 | Myers | |
| 2020/0202853 | A1 | 6/2020 | Ramic et al. | |
| 2021/0289607 | A1 | 9/2021 | Wilberding | |
| 2022/0115009 | A1* | 4/2022 | Sharifi | G10L 15/22 |
| 2022/0172727 | A1* | 6/2022 | Sharifi | G10L 15/22 |
| 2023/0352010 | A1* | 11/2023 | Sharifi | G10L 15/22 |

OTHER PUBLICATIONS

European Patent Office; International Search Report and Written Opinion issued in Application No. PCT/US2022/052425; 22 pages; dated Jun. 20, 2023.

"Future of In-Vehicle AI Powered Voice-Controlled Personal Assistant" Cheers Interactive (India) Private Limited.. Retrieved from https://www.futurebridge.com/industry/perspectives-mobility/future-of-in-vehicle-ai-powered-voice-controlled-personal-assistant. 12 pages. Dated Jun. 30, 2021.

* cited by examiner

MULTIPLE CONCURRENT VOICE ASSISTANTS

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). However, when the predicted output indicates that a hotword is not present, corresponding audio data will be discarded without any further processing, thereby conserving resources and user privacy.

Different automated assistants may be invoked using different hotwords and may support different capabilities. For example, a first automated assistant may be invoked by the hotword "Hey Assistant", and may be capable of handling a variety of general tasks including messaging tasks, search tasks, phone calling tasks, etc. A second automated assistant may be invoked by the hotword "Computer", and may also be capable of handling a variety of general tasks including messaging tasks, search tasks, phone calling tasks, etc. A third automated assistant may be invoked by the hotword "Hello Car", and may be capable of handling a variety of vehicle-related tasks, such as changing climate control settings and changing entertainment system settings.

A client device that implements two or more different automated assistants, such as the three automated assistants in the example above, may provide a configuration option that allows for the selection of a particular automated assistant. However, a user may be unable to utilize automated assistants other than the selected automated assistant. Changing the selected automated assistant may require a user to locate and enter a settings menu, locate the option to select a different automated assistant, and specify a new automated assistant, in order to utilize the new automated assistant. Additionally, a user may not know which automated assistant is active and may attempt to perform tasks that are not supported by the active automated assistant, which may lead to a negative user experience and can waste network and/or computational resources as the automated assistant attempts to handle an unsupported task and fails to fulfill the request.

SUMMARY

Some implementations disclosed herein are directed to supporting multiple concurrent voice assistants. As described in more detail herein, two or more automated assistants may listen for multiple hotwords. A user may be able to select a particular automated assistant to handle a particular request by speaking the hotword associated with the particular automated assistant. For example, a first automated assistant may listen for a first hotword, and a second automated assistant may listen for a second hotword. Upon initiation of a session by one of the automated assistants, control of microphone(s) and speaker(s) may be provided to the automated assistant that initiated the session, and the other automated assistant(s) may be prevented from accessing microphone(s), speaker(s), and output audio data of the automated assistant that initiated the session.

In an example, an in-vehicle computer may support a first automated assistant that may be invoked by the hotword "Hey Assistant", and may be capable of handling a variety of general tasks including messaging tasks, search tasks, phone calling tasks, etc. The in-vehicle computer may also support a second automated assistant that may be invoked by the hotword "Computer", and may also be capable of handling a variety of general tasks including messaging tasks, search tasks, phone calling tasks, etc. The in-vehicle computer may also support a third automated assistant that may be invoked by the hotword "Hello Car", and may be capable of handling a variety of vehicle-related tasks, such as changing climate control settings and changing entertainment system settings.

In this example, without changing any configuration settings, a user may be able to invoke a first session with the first automated assistant on the in-vehicle computer to send a text message by saying, "Hey Assistant, tell Sarah I will arrive in ten minutes", and then, after the first session ends, invoke a second session with the third automated assistant on the in-vehicle computer to change a climate control setting by saying, "Hello Car, lower cabin temperature". In some implementations, a visualization may be provided that indicates which automated assistant(s) is active (e.g., triggered by a hotword) and/or receiving audio data from the microphone(s). By allowing a user to utilize any supported automated assistant without changing a configuration setting, failures when a user attempts to utilize automated assistants other than a selected automated assistant may be avoided, resulting in an improved user experience and more efficient utilization of network and/or computational resources.

In the example, during the first session with the first automated assistant, the third automated assistant may generate a notification, "Vehicle maintenance due in 500 miles". However, the in-vehicle computer may prevent the third automated assistant from interrupting the first session to present the vehicle maintenance notification on a display of the in-vehicle computer, due to a lower priority associated with the notification. This notification may be temporarily suppressed, until the first session ends. Once the first session has ended, the vehicle maintenance notification may be presented.

Continuing with the example, during the second session with the third automated assistant, the first automated assistant may generate a navigation notification, "Turn right in 200 feet". Due to a higher priority associated with the navigation notification, the second session may be interrupted to present the navigation notification.

In some implementations, two or more automated assistants may listen for multiple hotwords concurrently while accessibility services are active. Upon initiation of a session by one of the automated assistants, control of microphone(s) and speaker(s) may be provided to the automated assistant that initiated the session, and the other automated assistant(s) may be prevented from accessing microphone(s), speaker(s), and output audio data of the automated assistant that initiated the session. Accessibility services may remain active during the automated assistant session, and the automated assistant may support tasks related to accessibility.

In various implementations, a method implemented by one or more processors may include concurrently providing a first automated assistant and a second automated assistant with access to one or more microphones; receiving, from the first automated assistant, an indication that the first automated assistant has initiated a first session; in response to receiving, from the first automated assistant, the indication that the first automated assistant has initiated the first session: continuing providing, to the first automated assistant, access to the one or more microphones; discontinuing providing, to the second automated assistant, access to the one or more microphones; and preventing the second automated assistant from accessing one or more portions of an output audio data stream provided for rendering via one or more speakers, the one or more portions including output audio data of the first automated assistant; receiving, from the first automated assistant, an indication that the first session has ended; and in response to receiving, from the first automated assistant, the indication that the first session has ended: continuing providing, to the first automated assistant, access to the one or more microphones; resuming providing, to the second automated assistant, access to the one or more microphones; and resuming providing, to the second automated assistant, the output audio data stream. The second automated assistant may use the output audio data stream in noise cancellation.

In some implementations, preventing the second automated assistant from accessing the one or more portions of the output audio data stream includes preventing the second automated assistant from accessing the output audio data stream while the first automated assistant is providing audible output during the first session.

In some implementations, the method may further include determining that a phone call has been initiated; in response to determining that the phone call has been initiated, discontinuing providing, to the first automated assistant and to the second automated assistant, access to the one or more microphones; determining that the phone call has ended; and in response to determining that the phone call has ended, resuming providing, to the first automated assistant and to the second automated assistant, access to the one or more microphones.

In some implementations, the method may further include, subsequent to receiving, from the first automated assistant, the indication that the first automated assistant has initiated the first session, and prior to receiving, from the first automated assistant, the indication that the first session has ended: identifying a notification, from the second automated assistant, to be output; determining a priority of the notification; and in response to the priority of the notification satisfying a threshold, prior to receiving, from the first automated assistant, the indication that the first session has ended, outputting the notification.

In some implementations, the method may further include buffering, in a buffer, the one or more portions of the output audio data stream that include the output audio data of the first automated assistant; pausing presentation of the one or more portions of the output audio data stream that include the output audio data of the first automated assistant, while outputting the notification from the second automated assistant; and after outputting the notification from the second automated assistant, resuming, from the buffer, presentation of the one or more portions of the output audio data stream that include the output audio data of the first automated assistant.

In some implementations, the method may further include, subsequent to receiving, from the first automated assistant, the indication that the first automated assistant has initiated the first session, and prior to receiving, from the first automated assistant, the indication that the first session has ended: identifying a notification, from the second automated assistant, to be output; determining a priority of the notification; and in response to the priority of the notification not satisfying a threshold, suppressing the notification until receiving, from the first automated assistant, the indication that the first session has ended.

In some implementations, the method may further include buffering, in a buffer, the notification; and in response to receiving, from the first automated assistant, the indication that the first session has ended, outputting, from the buffer, the notification.

In some implementations, the method may further include receiving, via a graphical user interface, user interface input that is a request to initiate, on the second automated assistant, a second session; in response to receiving the user interface input: causing the second automated assistant to initiate the second session; continuing providing, to the second automated assistant, access to the one or more microphones; discontinuing providing, to the first automated assistant, access to the one or more microphones; and preventing the first automated assistant from accessing output audio data of the second automated assistant.

In some implementations, the method may further include, subsequent to receiving, from the first automated assistant, the indication that the first automated assistant has initiated the first session, and prior to receiving, from the first automated assistant, the indication that the first session has ended: displaying, on a graphical user interface, a visual indication that access to the one or more microphones is being provided to the first automated assistant.

In some implementations, the method may further include, subsequent to receiving, from the first automated assistant, the indication that the first automated assistant has initiated the first session: providing an audible indication that access to the one or more microphones is being provided to the first automated assistant.

In some implementations, the method may further include, in response to receiving, from the first automated assistant, the indication that the first automated assistant has initiated the first session: reassigning a physical button, that, upon activation, is configured to initiate a session of the second automated assistant, to instead initiate a session of the first automated assistant.

In some additional or alternative implementations, a computer program product may include one or more computer-readable storage media having program instructions collectively stored on the one or more computer-readable storage media. The program instructions may be executable to receive, via one or more microphones, first audio data that captures a first spoken utterance of a user; concurrently provide the first audio data to a first hotword detector of a first automated assistant and to a second hotword detector of a second automated assistant; receive a first confidence score based on a probability, determined by the first hotword detector of the first automated assistant, of a first hotword being present in the first audio data, and a second confidence score based on a probability, determined by the second hotword detector of the second automated assistant, of a second hotword being present in the first audio data; based on the first confidence score and the second confidence score: provide, to the first automated assistant, second audio data, received via the one or more microphones, that captures a second spoken utterance of the user that follows the first spoken utterance of the user; provide an indication that audio from the one or more microphones is being provided to the first automated assistant; and prevent the second automated assistant from obtaining the second audio data.

In some implementations, the first hotword detector processes the first audio data using one or more machine learning models of the first hotword detector to generate a first predicted output that indicates the probability of the first hotword being present in the first audio data; and the second hotword detector processes the first audio data using one or more machine learning models of the second hotword detector to generate a second predicted output that indicates the probability of the second hotword being present in the first audio data.

In some implementations, the first confidence score is higher than the second confidence score; and the first confidence score satisfies a threshold. In some implementations, the indication that audio from the one or more microphones is being provided to the first automated assistant is a visual indication that is displayed on a graphical user interface, or an audible indication.

In some additional or alternative implementations, a system may include a processor, a computer-readable memory, one or more computer-readable storage media, and program instructions collectively stored on the one or more computer-readable storage media. The program instructions may be executable to concurrently provide a first automated assistant and a second automated assistant with access to one or more microphones; receive, from the first automated assistant, an indication that the first automated assistant has initiated a first session; in response to receiving, from the first automated assistant, the indication that the first automated assistant has initiated the first session: continue providing, to the first automated assistant, access to the one or more microphones; discontinue providing, to the second automated assistant, access to the one or more microphones; and prevent the second automated assistant from accessing one or more portions of an output audio data stream provided for rendering via one or more speakers, the one or more portions including output audio data of the first automated assistant; receive, from the first automated assistant, an indication that the first session has ended; and in response to receiving, from the first automated assistant, the indication that the first session has ended: continue providing, to the first automated assistant, access to the one or more microphones; resume providing, to the second automated assistant, access to the one or more microphones; and resume providing, to the second automated assistant, the output audio data stream, wherein the second automated assistant uses the output audio data stream in noise cancellation.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1:
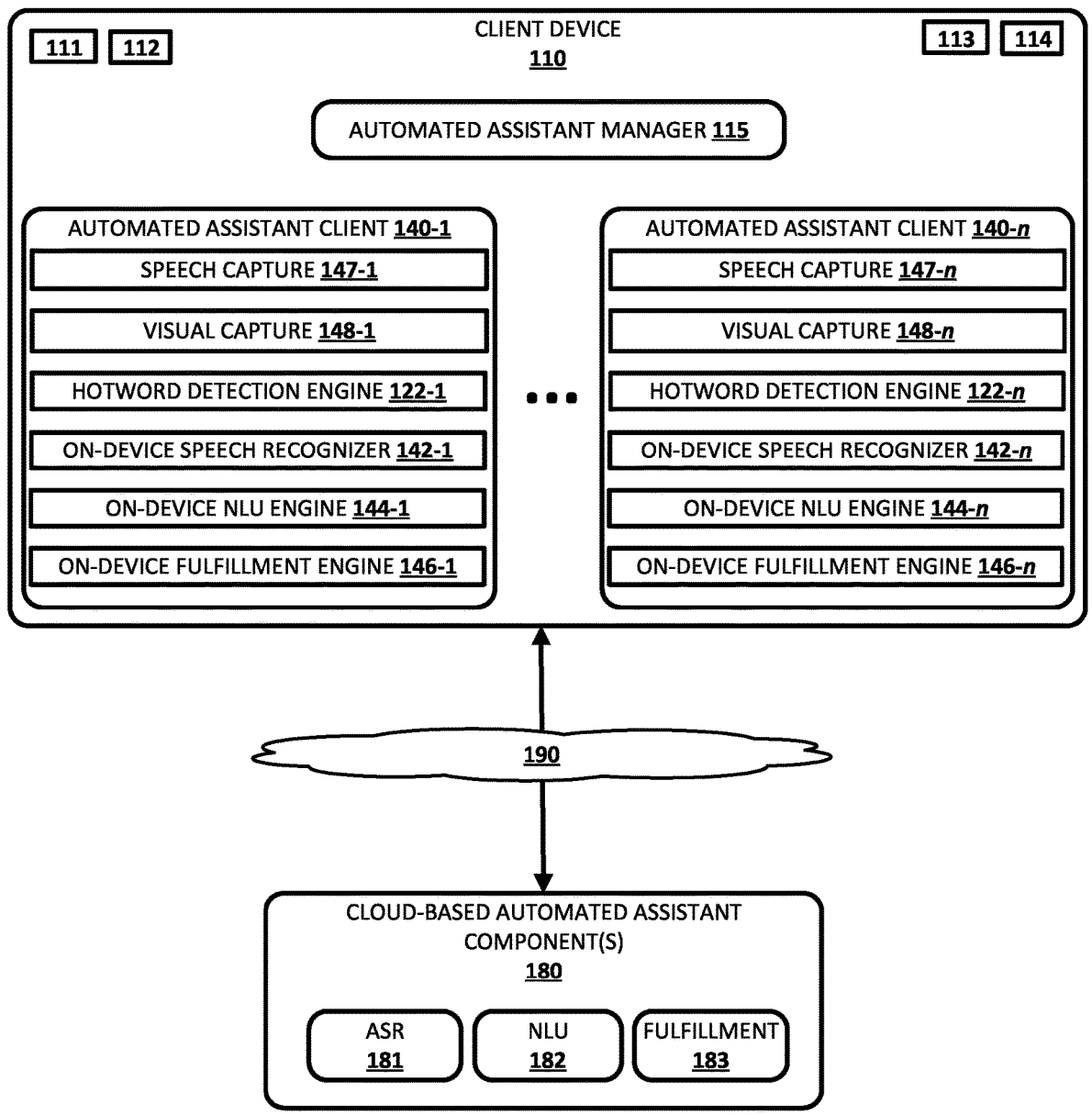
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as cloud-based automated assistant component(s) 180, may be implemented using one or more server computing devices that form what is sometimes referred to as a "cloud infrastructure," although this is not required.

The client device 110 in FIG. 1 is illustrated with one or more microphones 111, one or more speakers 112, one or more cameras and/or other vision components 113, and display(s) 114 (e.g., a touch-sensitive display). In some implementations, one or more of these components may be omitted. The client device 110 may further include pressure sensor(s), proximity sensor(s), accelerometer(s), magnetometer(s), and/or other sensor(s) that are used to generate other sensor data that is in addition to audio data captured by the one or more microphones 111.

The client device 110 at least selectively executes two or more automated assistant clients, e.g., first automated assistant client 140-1, . . . , and n-th automated assistant client 140-n. Each of the automated assistant clients 140-1, . . . , 140-n includes, in the example of FIG. 1, an on-device hotword detection engine 122-1, . . . , 122-n, an on-device speech recognizer 142-1, . . . , 142-n, an on-device natural language understanding (NLU) engine 144-1, . . . , 144-n, and an on-device fulfillment engine 146-1, . . . , 146-n. Each of the automated assistant clients 140-1, . . . , 140-n further includes a speech capture engine 147-1, . . . , 147-n and a visual capture engine 148-1, . . . , 148-n. Each of the automated assistant clients 140-1, . . . , 140-n can include additional and/or alternative engines, such as a voice activity detector (VAD) engine, an endpoint detector engine, and/or other engine(s).

One or more cloud-based automated assistant components 180 can optionally be implemented on one or more computing systems (collectively referred to as a "cloud" computing system) that are communicatively coupled to client device 110 via one or more local and/or wide area networks (e.g., the Internet) indicated generally at 190. The cloud-based automated assistant components 180 can be implemented, for example, via a cluster of high-performance servers.

In various implementations, an instance of an automated assistant client 140-1, . . . , 140-n, by way of its interactions with one or more cloud-based automated assistant components 180, may form what appears to be, from a user's perspective, a logical instance of an automated assistant with which the user may engage in a human-to-computer interactions (e.g., spoken interactions, gesture-based interactions, and/or touch-based interactions).

The client device 110 can be, for example, a computing device of a vehicle of the user (e.g., an in-vehicle communications system, an in-vehicle entertainment system, an in-vehicle navigation system, etc.). In other implementations, the client device 110 can be: a desktop computing device, a laptop computing device, a tablet computing device, a mobile phone computing device, a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 113 can take various forms, such as monographic cameras, stereographic cameras, a LIDAR component (or other laser-based component(s)), a radar component, etc. The one or more vision components 113 may be used, e.g., by the visual capture engine 148-1, . . . , 148-n, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 1, and/or other engine(s).

Speech capture engine 147-1, . . . , 147-n can be configured to capture user's speech and/or other audio data captured via microphone(s) 111. Further, the client device 110 may include pressure sensor(s), proximity sensor(s), accelerometer(s), magnetometer(s), and/or other sensor(s) that are used to generate other sensor data that is in addition to the audio data captured via the microphone(s) 111. Such audio data and other sensor data can be utilized by the hotword detection engine 122-1, . . . , 122-n, and/or other engine(s) to determine whether to initiate one or more currently dormant automated assistant functions, refrain from initiating one or more currently dormant automated assistant functions, and/or shut down one or more currently active automated assistant functions. In some implementations, the hotword detection engine 122-1, . . . , 122-n processes the audio and/or the other sensor data, using a machine learning model, to generate a predicted output.

The automated assistant client 140-1, . . . , 140-n can make a decision, based on determining whether the predicted output satisfies a threshold, of whether to initiate currently dormant automated assistant function(s), refrain from initiating currently dormant automated assistant function(s), and/or shut down currently active automated assistant function(s). The automated assistant functions can include: speech recognition to generate recognized text using the on-device speech recognizer 142-1, . . . , 142-n, natural language understanding (NLU) to generate NLU output using the on-device NLU engine 144-1, . . . , 144-n, generating a response based on the recognized text and/or the NLU output, transmission of the audio data to a remote server, and/or transmission of the recognized text to the remote server. For example, assume the predicted output is a probability (e.g., 0.80 or 0.90) and the threshold is a threshold probability (e.g., 0.85). If the automated assistant client 140-1, . . . , 140-n determines the predicted output (e.g., 0.90) satisfies the threshold (e.g., 0.85), then the automated assistant client 140-1, . . . , 140-n can initiate the currently dormant automated assistant function(s).

The automated assistant functions can include the on-device speech recognizer 142-1, . . . , 142-n, the on-device NLU engine 144-1, . . . , 144-n, the on-device fulfillment engine 146-1, . . . , 146-n, and additional and/or alternative engines. For example, on-device speech recognizer 142-1, . . . , 142-n can process audio data that captures a spoken utterance, utilizing an on-device speech recognition model, to generate recognized text that corresponds to the spoken utterance. On-device NLU engine 144-1, . . . , 144-n performs on-device natural language understanding, optionally utilizing an on-device NLU model, on the recognized text to generate NLU data. The NLU data can include, for example, intent(s) that correspond to the spoken utterance and optionally parameter(s) (e.g., slot values) for the intent(s). Further, the on-device fulfillment engine 146-1, . . . , 146-n generates fulfillment data, optionally utilizing an on-device fulfillment model, based on the NLU data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 114 can be utilized to display the recognized text from the on-device speech recognizer 142-1, . . . , 142-n, and/or one or more results from the execution. Display(s) 114 can further be one of the user interface output component(s) through which visual portion(s) of a response, from one of the automated assistant clients 140-1, . . . , 140-n, is rendered.

In some implementations, cloud-based automated assistant component(s) 180 can include a remote ASR engine 181 that performs speech recognition, a remote NLU engine 182 that performs natural language understanding, and/or a remote fulfillment engine 183 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 180 can be utilized at least selectively. For example, such component(s) can be utilized in parallel with on-device component(s) and output from such component(s) utilized when local component(s) fail. For example, the on-device fulfillment engine 146-1, . . . , 146-n, can fail in certain situations (e.g., due to relatively limited resources of client device 110) and remote fulfillment engine 183 can utilize the more robust resources of the cloud to generate fulfillment data in such situations. The remote fulfillment engine 183 can be operated in parallel with the on-device fulfillment engine 146-1, . . . , 146-n, and its results utilized when on-device fulfillment fails, or can be invoked responsive to determining failure of the on-device fulfillment engine 146-1, . . . , 146-n.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with one of the automated assistant clients 140-1, . . . , 140-n. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Still referring to FIG. 1, the client device 110 includes automated assistant manager 115, which manages the automated assistant clients 140-1, . . . , 140-n on the client device 110. In some implementations, the automated assistant manager 115 can selectively enable or disable individual automated assistant clients 140-1, . . . , 140-n on the client device 110. In some implementations, the automated assistant manager 115 may install or uninstall individual automated assistant clients 140-1, . . . , 140-n on the client device 110. The automated assistant manager 115 may provide a user interface that may be utilized by users of the client device 110 to perform various management functions with respect to the automated assistant clients 140-1, . . . , 140-n on the client device 110, such as the aforementioned selectively enabling, disabling, installing, or uninstalling of individual automated assistant clients 140-1, . . . , 140-n on the client device 110.

The automated assistant manager 115 may selectively permit or deny access, by individual automated assistant clients 140-1, . . . , 140-n, to the one or more microphones 111. The automated assistant manager 115 may also selectively permit or deny access, by individual automated assistant clients 140-1, . . . , 140-n, to the one or more cameras and/or other vision components 113 and/or other input or output devices of the client device 110. For example, the automated assistant manager 115 may manage access, by individual automated assistant clients 140-1, . . . , 140-n, to the one or more speakers 112, to prevent one of the individual automated assistant clients 140-1, . . . , 140-n from interrupting audio output of another of the individual automated assistant clients 140-1, . . . , 140-n.

Figure 2:
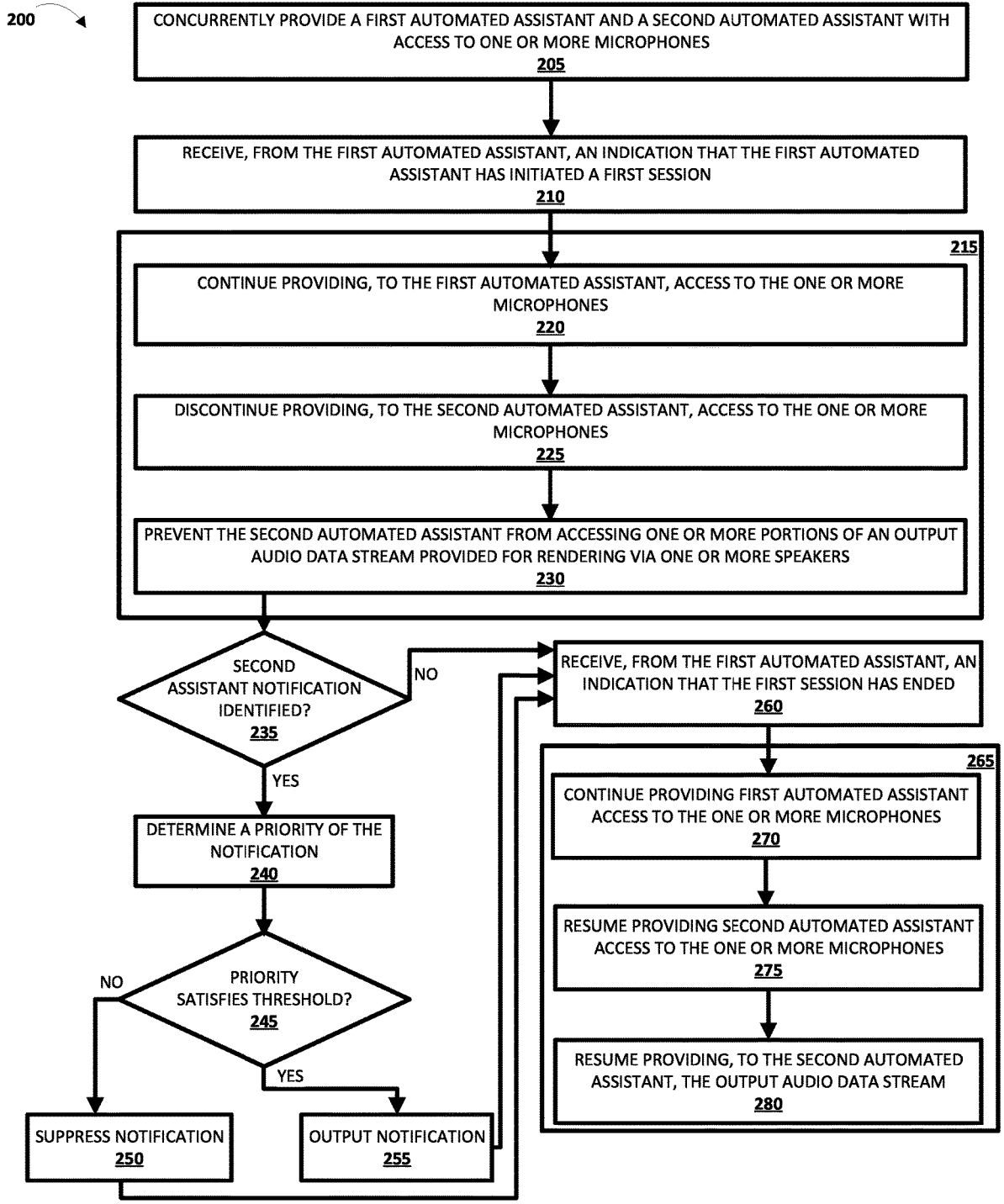
FIG. 2, FIG. 3, FIG. 4, and FIG. 5 depict flowcharts illustrating example methods for concurrent voice assistants.

FIG. 2 depicts a flowchart illustrating an example method 200 for concurrent voice assistants. For convenience, the operations of the method 200 are described with reference to a system that performs the operations. This system of method 200 includes one or more processors and/or other component(s) of a client device. Moreover, while operations of the method 200 are shown in a particular order, this is not meant to be limiting. One or more operations may be reordered, omitted, or added.

At block 205, the system concurrently provides a first automated assistant and a second automated assistant with access to one or more microphones. In some implementations, the automated assistant manager 115 of the client device 110 concurrently provides the automated assistant clients 140-1, . . . , 140-n of the client device 110 with access to the one or more microphones 111 of the client device 110. For example, the automated assistant manager 115 may concurrently provide the automated assistant clients 140-1, . . . , 140-n with access to an input audio data stream that includes audio detected by the one or more microphones 111.

At block 210, the system receives, from the first automated assistant, an indication that the first automated assistant has initiated a first session. In some implementations, the automated assistant manager 115 of the client device 110 receives, from a first automated assistant client (e.g., the automated assistant client 140-1), an indication that the first automated assistant client has initiated a first session.

In an example, the hotword detection engine 122-1 of the first automated assistant client 140-1 receives the input audio data stream that includes audio detected by the one or more microphones 111 to which access is provided at block 205. The input audio data stream can be utilized by the hotword detection engine 122-1, which may process the audio and/or other sensor data, using a machine learning model, to generate a predicted output. The first automated assistant client 140-1 can make a decision, based on determining whether the predicted output satisfies a threshold, of whether to initiate currently dormant automated assistant function(s), e.g., in a first session.

Still referring to FIG. 2, at block 215, the system, responsive to receiving, from the first automated assistant, the indication that the first automated assistant has initiated the first session, performs the functions of blocks 220, 225, and 230. In some implementations, the automated assistant manager 115 of the client device 110 performs the functions of blocks 220, 225, and 230, responsive to receiving the indication that the first automated assistant has initiated a first session at block 210.

Still referring to block 215, in some implementations, subsequent to receiving, from the first automated assistant, the indication that the first automated assistant has initiated the first session at block 210, and prior to receiving, from the first automated assistant, the indication that the first session has ended at block 265, the system may display, on a graphical user interface (e.g., on display(s) 114 of the client device 110), a visual indication that access to the one or more microphones is being provided to the first automated assistant. The visual indication may be an icon or other graphic and may identify the first automated assistant (e.g., by including a logo, name, abbreviation, or other visual representation of the first automated assistant).

Still referring to block 215, in some implementations, subsequent to receiving, from the first automated assistant, the indication that the first automated assistant has initiated the first session at block 210, the system may provide an audible indication that access to the one or more microphones is being provided to the first automated assistant. The audible indication may be a chime, spoken word or phrase, or other sound that may identify the first automated assistant.

Still referring to block 215, in some implementations, in response to receiving, from the first automated assistant, the indication that the first automated assistant has initiated the first session, the system may reassign a physical button, that, upon activation, is configured to initiate a session of the second automated assistant, to instead initiate a session of the first automated assistant. For example, a vehicle in which the client device 110 is installed may include a steering wheel button that initiates an automated assistant session. The steering wheel button may be automatically configured by the automated assistant manager 115 of the client device 110 to initiate the automated assistant session using the particular automated assistant client that was most recently invoked, for example, the first automated assistant client 140-1, which initiated the first session at block 210. This may modify a previous configuration (e.g., to initiate the automated assistant session using the second automated assistant client). The new configuration of the physical button may be maintained for a predetermined time (e.g., 10 minutes). Alternatively, the new configuration of the physical button may be maintained until a particular event has occurred, e.g., a user invokes a different automated assistant.

In other implementations, there may be multiple physical buttons, each of which, upon activation, initiates a session of a particular automated assistant corresponding to the particular physical button. The system may provide configuration options that allow a user to specify mappings between particular physical buttons and particular automated assistants. In still other implementations, in response to various gestures, the system may initiate a session of a particular automated assistant. For example, the various gestures may include a long press or a short press on a particular area of a screen, an on-screen button, or a physical button; a single tap or a double tap on a particular area of a screen, an on-screen button, or a physical button; some other physical input; etc.

Still referring to FIG. 2, at block 220, the system continues providing, to the first automated assistant, access to the one or more microphones. In some implementations, the automated assistant manager 115 of the client device 110 continues providing, to the first automated assistant client 140-1, access to the one or more microphones 111 of the client device 110.

In an example, the first automated assistant client 140-1 continues to receive the input audio data stream that includes audio detected by the one or more microphones 111. The on-device speech recognizer 142-1 of the automated assistant client 140-1 may process audio data of the input audio data stream that captures a spoken utterance, utilizing an on-device speech recognition model, to generate recognized text that corresponds to the spoken utterance. On-device NLU engine 144-1 of the automated assistant client 140-1 may perform on-device natural language understanding, optionally utilizing an on-device NLU model, on the recognized text to generate NLU data. The NLU data may include, for example, intent(s) that correspond to the spoken utterance and optionally parameter(s) (e.g., slot values) for the intent(s). Further, the on-device fulfillment engine 146-1 of the automated assistant client 140-1 may generate fulfillment data, optionally utilizing an on-device fulfillment model, based on the NLU data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Still referring to FIG. 2, at block 225, the system discontinues providing, to the second automated assistant, access to the one or more microphones. In some implementations, the automated assistant manager 115 of the client device 110 discontinues providing, to the second automated assistant client (e.g., the automated assistant client 140-n), access to the one or more microphones 111 of the client device 110. In an example, the automated assistant client 140-n is prevented from receiving the input audio data stream that includes audio detected by the one or more microphones 111.

At block 230, the system prevents the second automated assistant from accessing one or more portions of an output audio data stream provided for rendering via one or more speakers, the one or more portions including output audio data of the first automated assistant. In some implementations, the automated assistant manager 115 of the client device 110 prevents the second automated assistant client (e.g., the automated assistant client 140-n) from accessing one or more portions of an output audio data stream provided for rendering via the one or more speakers 112 of the client device 110. The one or more portions of the output audio data stream that the automated assistant client 140-n is prevented from accessing may include output audio data of the first automated assistant client 140-1, such output audio data that is an audible response to a spoken utterance of a user, the response being generated by the on-device fulfillment engine 146-1 of the first automated assistant client 140-1 and rendered by utilizing a text-to-speech module of the first automated assistant client 140-1.

At block 235, the system determines whether or not a notification, from the second automated assistant, to be output has been identified. In some implementations, the automated assistant manager 115 of the client device 110 determines whether or not a notification, from the second automated assistant client (e.g., the automated assistant client 140-n), to be output (e.g., via the one or more speakers 112 of the client device 110) has been identified.

In an example, the automated assistant client 140-n may provide, to the automated assistant manager 115, a notification to be output via the one or more speakers 112 of the client device 110. The notification may be a navigation notification from a navigation application (e.g., "Turn right in 200 feet"), a new message notification from a messaging application, an incoming telephone call notification from a phone application, etc.

Still referring to block 235, in response to determining that a notification, from the second automated assistant, to be output, has been identified, the flow proceeds to block 240. On the other hand, in response to determining that a notification, from the second automated assistant, to be output, has not been identified, the flow proceeds to block 260.

Still referring to FIG. 2, at block 240, the system determines a priority of the notification. In some implementations, the automated assistant manager 115 of the client device 110 determines the priority of the notification received at block 235. The priority may be numerical (e.g., 1 through 5), category-based (e.g., low/medium/high), or based on any other measure. In an example, alerts that are likely to require immediate action by a user (e.g., a navigation notification) are assigned relatively higher priorities, and alerts that are less likely to require immediate action by the user are assigned relatively lower priorities (e.g., a notification of an incoming email message).

At block 245, the system determines whether or not the priority of the notification satisfies a threshold. In some implementations, the automated assistant manager 115 of the client device 110 determines whether or not the priority of the notification received at block 240 satisfies a threshold. In an example, at block 240, the system may determine whether the notification received at block 235 has a high priority, medium priority, or low priority. In the example, the threshold may be satisfied if the priority of the notification is high, and the threshold may not be satisfied if the priority of the notification is medium or low.

Still referring to block 245, in response to determining that the priority of the notification does not satisfy the threshold, the flow proceeds to block 250. On the other hand, in response to determining that the priority of the notification satisfies the threshold, the flow proceeds to block 255.

At block 250, in response to the priority of the notification not satisfying a threshold, the system suppresses the notification until receiving, from the first automated assistant, an indication that the first session has ended. In some implementations, at block 250, in response to the priority of the notification identified at block 235 not satisfying the threshold at block 245, the automated assistant manager 115 of the client device 110 suppresses the notification until receiving, from the first automated assistant client 140-1, the indication that the first session has ended at block 260. In some implementations, suppressing the notification includes avoiding presenting the notification on the client device 110, for example, by avoiding rendering an audio element of the notification via the one or more speakers 112 of the client device 110. Suppressing the notification may also include avoiding rendering a visual element of the notification via the display(s) 114 of the client device 110.

Still referring to block 250, in some implementations, the automated assistant manager 115 of the client device 110 buffers, in a buffer, the notification that is being suppressed. In some implementations, in response to receiving, from the first automated assistant (e.g., the first automated assistant client 140-1), the indication that the first session has ended, the automated assistant manager 115 of the client device 110 may output, from the buffer, the notification, for example, by rendering an audio element of the notification via the one or more speakers 112 of the client device 110 and/or rendering a visual element of the notification via the display(s) 114 of the client device 110.

Still referring to FIG. 2, at block 255, in response to the priority of the notification satisfying a threshold, prior to receiving, from the first automated assistant, an indication that the first session has ended, the system outputs the notification. In some implementations, at block 255, in response to the priority of the notification identified at block 235 satisfying the threshold at block 245, the automated assistant manager 115 of the client device 110, prior to receiving, from the first automated assistant client 140-1, the indication that the first session has ended at block 260, outputs the notification. In some implementations, outputting the notification includes presenting the notification on the client device, for example, by rendering an audio element of the notification via the one or more speakers 112 of the client device 110. Outputting the notification may also include rendering a visual element of the notification via the display(s) 114 of the client device 110.

Still referring to block 255, in some implementations, the automated assistant manager 115 of the client device 110 may buffer, in a buffer, the one or more portions of the output audio data stream that include the output audio data of the first automated assistant. The automated assistant manager 115 may pause presentation of the one or more portions of the output audio data stream that include the output audio data of the first automated assistant, while outputting the notification from the second automated assistant. In some implementations, after outputting the notification from the second automated assistant, the automated assistant manager 115 may resume, from the buffer, presentation of the one or more portions of the output audio data stream that include the output audio data of the first automated assistant.

Still referring to FIG. 2, at block 260, the system receives, from the first automated assistant, an indication that the first session has ended. In some implementations, the automated assistant manager 115 of the client device 110 receives, from the first automated assistant client 140-1, the indication that the first session, initiated at block 210, has ended. For example, the first automated assistant client 140-1 may shut down one or more currently active automated assistant functions, based on completing performance/execution of the determined action(s) to resolve a spoken utterance, and responsive to shutting down the one or more currently active automated assistant functions, send the indication that the first session has ended to the automated assistant manager 115.

At block 265, the system, responsive to receiving, from the first automated assistant, the indication that the first session has ended, performs the functions of blocks 270, 275, and 280. In some implementations, the automated assistant manager 115 of the client device 110 performs the functions of blocks 270, 275, and 280.

At block 270, the system continues providing, to the first automated assistant, access to the one or more microphones.

In some implementations, the automated assistant manager 115 of the client device 110 continues providing, to the first automated assistant client 140-1, access to the one or more microphones 111 of the client device 110. In an example, the first automated assistant client 140-1 continues to receive the input audio data stream that includes audio detected by the one or more microphones 111.

At block 275, the system resumes providing, to the second automated assistant, access to the one or more microphones. In some implementations, the automated assistant manager 115 of the client device 110 resumes providing, to the second automated assistant client (e.g., the automated assistant client 140-n), access to the one or more microphones 111 of the client device 110. In an example, the automated assistant client 140-n is permitted to receive the input audio data stream that includes audio detected by the one or more microphones 111.

At block 280, the system resumes providing, to the second automated assistant, the output audio data stream. In some implementations, the automated assistant manager 115 of the client device 110 resumes providing, to the second automated assistant client (e.g., the automated assistant client 140-n), the output audio data stream. In some implementations, the second automated assistant uses the output audio data stream in noise cancellation (e.g., acoustic echo cancellation).

Figure 3:
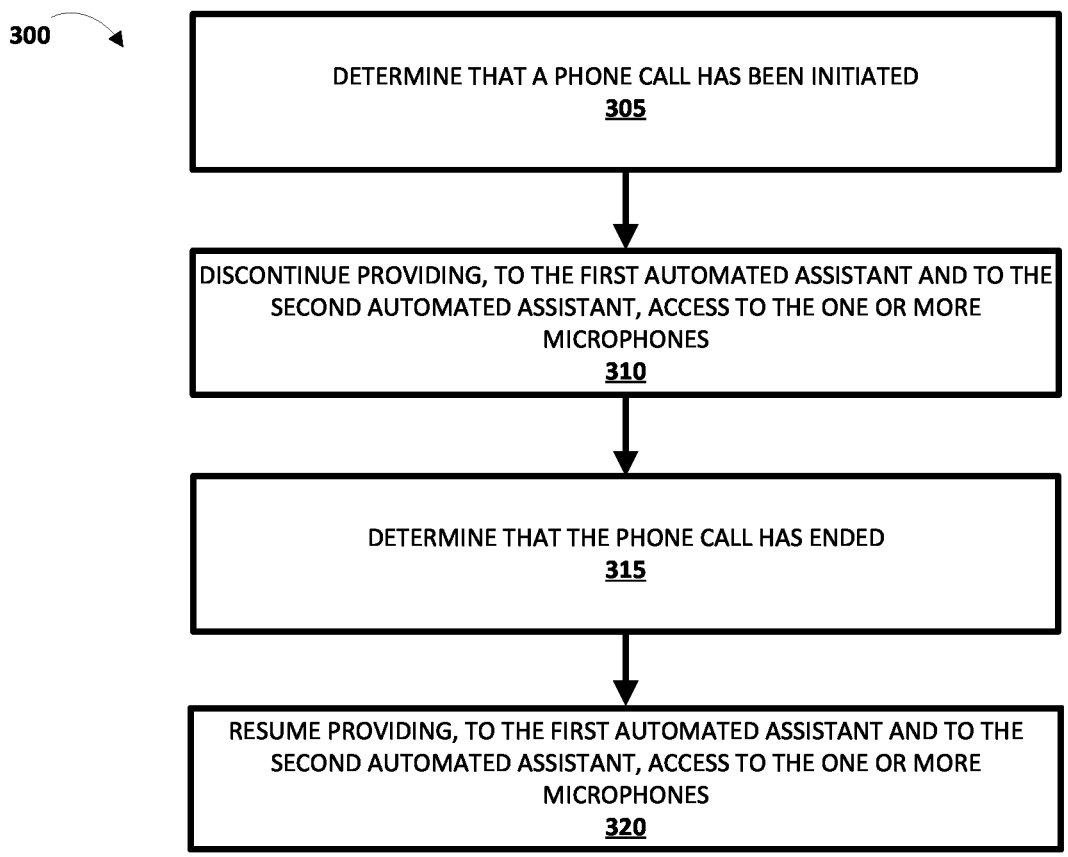

FIG. 3 depicts a flowchart illustrating an example method 300 for concurrent voice assistants. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added. The operations of method 300 may be performed at any point during the method 200 of FIG. 2, e.g., if a phone call is initiated.

At block 305, the system determines that a phone call has been initiated. In some implementations, the automated assistant manager 115 of the client device 110 determines that a phone call has been initiated (e.g., an outgoing call is placed, or an incoming call is answered).

At block 310, in response to determining that the phone call has been initiated, the system discontinues providing, to the first automated assistant and to the second automated assistant, access to the one or more microphones. In some implementations, the automated assistant manager 115 of the client device 110 discontinues providing, to the first automated assistant client 140-1 and the second automated assistant client (e.g., the automated assistant client 140-n), access to the one or more microphones 111 of the client device 110. In an example, the automated assistant client 140-1 and the automated assistant client 140-n are prevented from receiving the input audio data stream that includes audio detected by the one or more microphones 111.

At block 315, the system determines that the phone call has ended. In some implementations, the automated assistant manager 115 of the client device 110 determines that the phone call has ended.

At block 320, in response to determining that the phone call has ended, the system resumes providing, to the first automated assistant and to the second automated assistant, access to the one or more microphones. In some implementations, the automated assistant manager 115 of the client device 110 resumes providing, to the first automated assistant client 140-1 and the second automated assistant client (e.g., the automated assistant client 140-n), access to the one or more microphones 111 of the client device 110. In an example, the automated assistant client 140-1 and the automated assistant client 140-n are permitted to receive the input audio data stream that includes audio detected by the one or more microphones 111.

Figure 4:
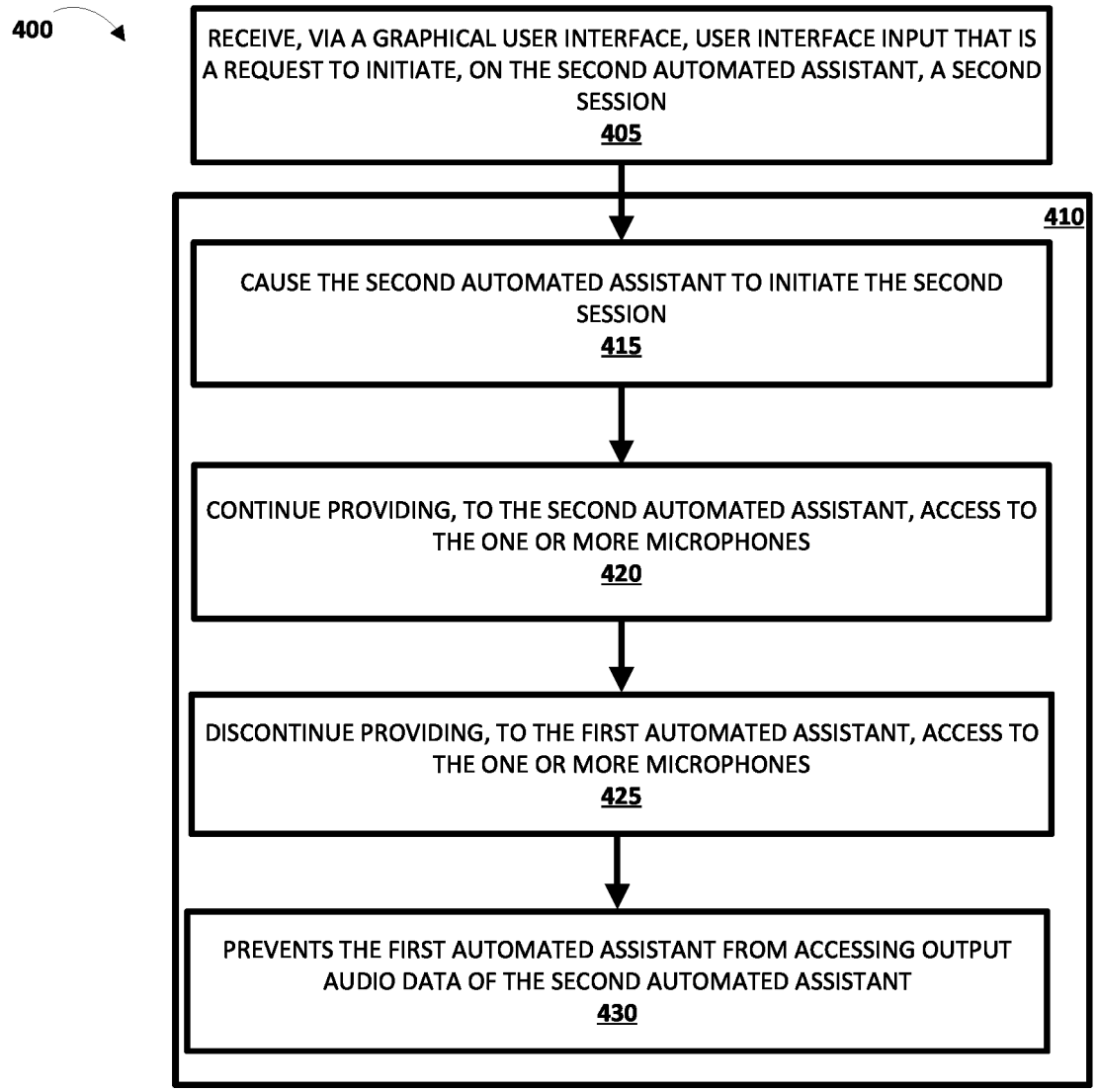

FIG. 4 depicts a flowchart illustrating an example method 400 for concurrent voice assistants. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added. The operations of method 400 may be performed, for example, following the operations of block 280 of method 200 of FIG. 2.

At block 405, the system receives, via a graphical user interface, user interface input that is a request to initiate, on the second automated assistant, a second session. In some implementations, the automated assistant manager 115 of the client device 110 receives, via a graphical user interface displayed on display(s) 114 of the client device 110, user interface input that is a request to initiate, on the second automated assistant client (e.g., automated assistant client 140-n), a second session. For example, a user may activate a button displayed on display(s) 114 of the client device 110 that invokes a particular automated assistant, e.g., automated assistant client 140-n. The automated assistant manager 115 may interpret this user interface input as a request to initiate, on the automated assistant client 140-n, a second session.

At block 410, the system, in response to receiving the user interface input, performs the functions of blocks 415, 420, 425, and 430. In some implementations, the automated assistant manager 115 of the client device 110 performs the functions of blocks 415, 420, 425, and 430 in response to receiving the user interface input at block 405.

At block 415, the system causes the second automated assistant to initiate the second session. In some implementations, the automated assistant manager 115 of the client device 110 causes the second automated assistant client (e.g., automated assistant client 140-n) to initiate the second session. For example, the automated assistant client 140-n may initiate currently dormant automated assistant function(s). The automated assistant functions can include: speech recognition to generate recognized text using the on-device speech recognizer 142-n, natural language understanding (NLU) to generate NLU output using the on-device NLU engine 144-n, generating a response based on the recognized text and/or the NLU output, transmission of the audio data to a remote server, and/or transmission of the recognized text to the remote server.

At block 420, the system continues providing, to the second automated assistant, access to the one or more microphones. In some implementations, the automated assistant manager 115 of the client device 110 continues providing, to the second automated assistant client (e.g., automated assistant client 140-n), access to the one or more microphones 111 of the client device 110.

In an example, the automated assistant client 140-n continues to receive the input audio data stream that includes audio detected by the one or more microphones 111. The on-device speech recognizer 142-n of the automated assistant client 140-n may process audio data of the input audio data stream that captures a spoken utterance, utilizing an on-device speech recognition model, to generate recognized text that corresponds to the spoken utterance. On-device NLU engine 144-n of the automated assistant client 140-n may perform on-device natural language understanding, optionally utilizing an on-device NLU model, on the recognized text to generate NLU data. The NLU data may include, for example, intent(s) that correspond to the spoken utterance and optionally parameter(s) (e.g., slot values) for the intent(s). Further, the on-device fulfillment engine 146-n of the automated assistant client 140-n may generate fulfillment data, optionally utilizing an on-device fulfillment model, based on the NLU data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

At block 425, the system discontinues providing, to the first automated assistant, access to the one or more microphones. In some implementations, the automated assistant manager 115 of the client device 110 discontinues providing, to the first automated assistant client 140-1, access to the one or more microphones 111 of the client device 110. In an example, the automated assistant client 140-1 is prevented from receiving the input audio data stream that includes audio detected by the one or more microphones 111.

At block 430, the system prevents the first automated assistant from accessing output audio data of the second automated assistant. In some implementations, the automated assistant manager 115 of the client device 110 prevents the first automated assistant client 140-1 from accessing output audio data of the automated assistant client 140-n provided for rendering via the one or more speakers 112 of the client device 110. The output audio data that the automated assistant client 140-1 is prevented from accessing may include output audio data of the automated assistant client 140-n, such output audio data being an audible response to a spoken utterance of a user, the response being generated by the on-device fulfillment engine 146-n of the automated assistant client 140-n and rendered by utilizing a text-to-speech module of the automated assistant client 140-n.

Figure 5:
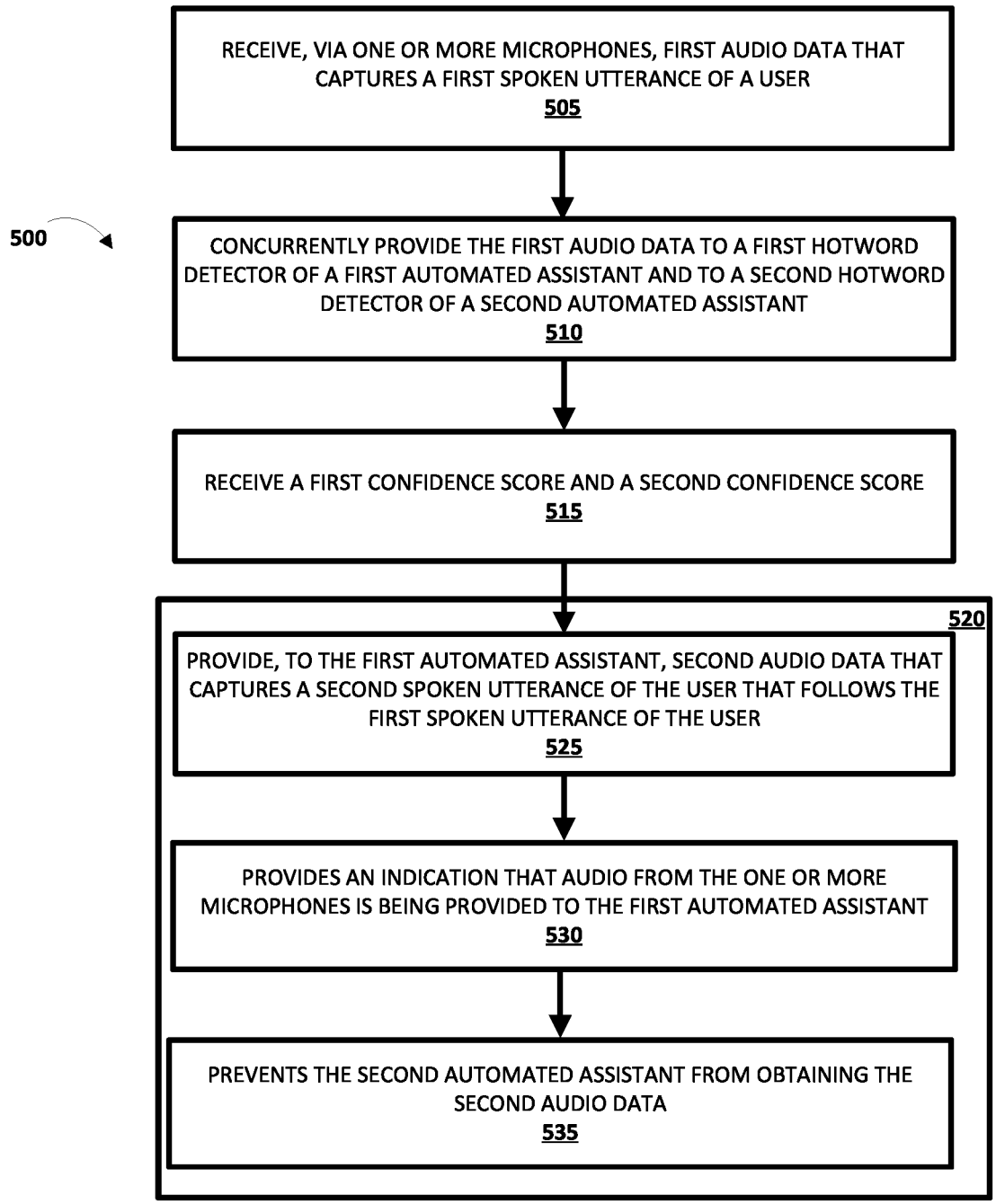

FIG. 5 depicts a flowchart illustrating an example method 500 for concurrent voice assistants. For convenience, the operations of the method 500 are described with reference to a system that performs the operations. This system of method 500 includes one or more processors and/or other component(s) of a client device. Moreover, while operations of the method 500 are shown in a particular order, this is not meant to be limiting. One or more operations may be reordered, omitted, or added.

At block 505, the system receives, via one or more microphones, first audio data that captures a first spoken utterance of a user. In some implementations, the automated assistant manager 115 of the client device 110 receives, via the one or more microphones 111 of the client device 110, first audio data that captures a first spoken utterance of a user.

At block 510, the system concurrently provides the first audio data to a first hotword detector of a first automated assistant and to a second hotword detector of a second automated assistant. In some implementations, the automated assistant manager 115 of the client device 110 concurrently provides the first audio data received at block 505 to the hotword detection engine 122-1 of the first automated assistant client 140-1 and to the hotword detection engine 122-n of the automated assistant client 140-n.

In some implementations, the first hotword detector processes the first audio data using one or more machine learning models of the first hotword detector to generate a first predicted output that indicates the probability of the first hotword being present in the first audio data. In some implementations, the second hotword detector processes the first audio data using one or more machine learning models of the second hotword detector to generate a second predicted output that indicates the probability of the second hotword being present in the first audio data.

At block 515, the system receives a first confidence score based on a probability, determined by the first hotword detector of the first automated assistant, of a first hotword being present in the first audio data, and a second confidence score based on a probability, determined by the second hotword detector of the second automated assistant, of a second hotword being present in the first audio data. In some implementations, the automated assistant manager 115 of the client device 110 receives a first confidence score based on a probability, determined by the hotword detection engine 122-1 of the first automated assistant client 140-1, of a first hotword being present in the first audio data provided at block 510, and a second confidence score based on a probability, determined by the hotword detection engine 122-n of the automated assistant client 140-n, of a second hotword being present in the first audio data provided at block 510.

At block 520, based on the first confidence score and the second confidence score, the system performs the functions of blocks 525, 530, and 535. In some implementations, based on the first confidence score and the second confidence score, the automated assistant manager 115 of the client device 110 performs the functions of blocks 525, 530, and 535. In some implementations, the functions of blocks 525, 530, and 535 are performed based on the first confidence score being higher than the second confidence score, and the first confidence score satisfying a threshold.

At block 525, the system provides, to the first automated assistant, second audio data, received via the one or more microphones, that captures a second spoken utterance of the user that follows the first spoken utterance of the user. In some implementations, the automated assistant manager 115 of the client device 110 provides, to the first automated assistant client 140-1, second audio data, received via the one or more microphones, that captures a second spoken utterance of the user that follows the first spoken utterance of the user received at block 505.

At block 530, the system provides an indication that audio from the one or more microphones is being provided to the first automated assistant. In some implementations, the automated assistant manager 115 of the client device 110 provides an indication that audio from the one or more microphones 111 of the client device 110 is being provided to the first automated assistant client 140-1. In some implementations, the indication that audio from the one or more microphones is being provided to the first automated assistant is a visual indication that is displayed on a graphical user interface, or an audible indication.

For example, the indication may be a visual indication that audio from the one or more microphones 111 is being provided to the first automated assistant client 140-1. The visual indication may be an icon or other graphic and may identify the first automated assistant client 140-1 (e.g., by including a logo, name, abbreviation, or other visual representation of the first automated assistant). In another example, the indication may be an audible indication that audio from the one or more microphones 111 is being provided to the first automated assistant client 140-1. The audible indication may be a chime, spoken word or phrase, or other sound that may identify the first automated assistant client 140-1.

At block 535, the system prevents the second automated assistant from obtaining the second audio data. In some implementations, the automated assistant manager 115 of the client device 110 may prevent the automated assistant client 140-n from obtaining the second audio data from block 525.

Figure 6:
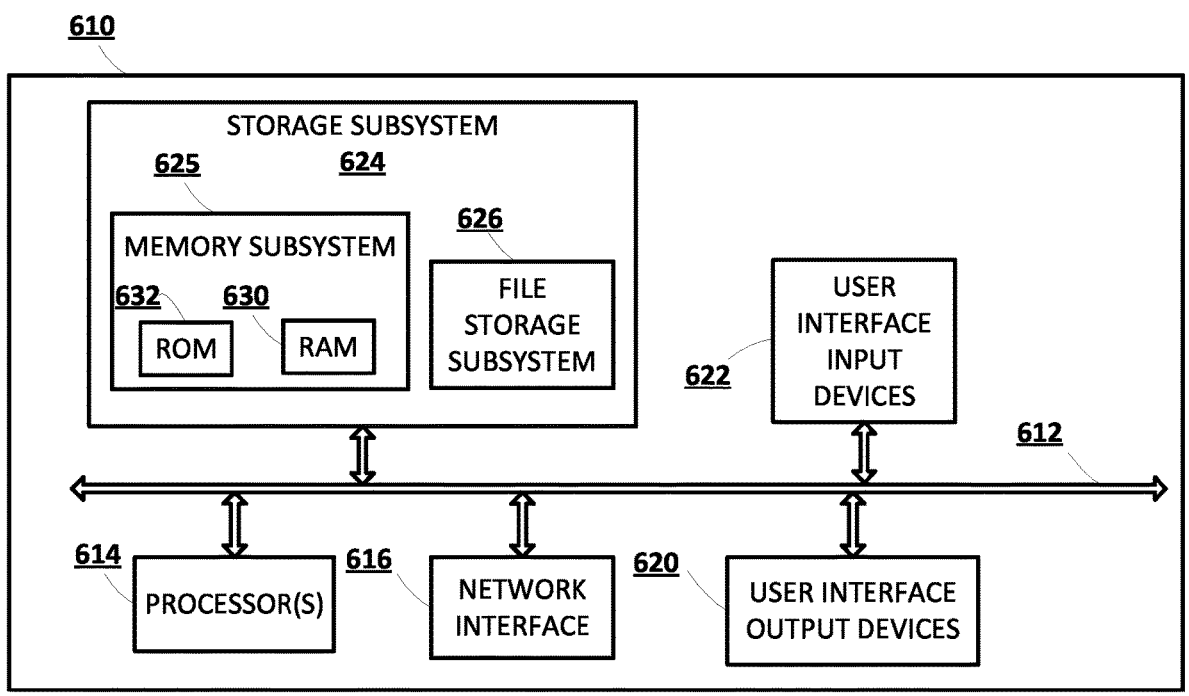
FIG. 6 depicts an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. The memory subsystem 625 included in the storage subsystem 624 can include a number of memories including a main random access memory (RAM) 630 for storage of instructions and data during program execution and a read only memory (ROM) 632 in which fixed instructions are stored.

A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information, the users may be provided with an opportunity to control whether programs or features collect user information (e.g., spoken utterances), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
concurrently providing a first automated assistant and a second automated assistant with access to one or more microphones;
receiving, from the first automated assistant, an indication that the first automated assistant has initiated a first session;
in response to receiving, from the first automated assistant, the indication that the first automated assistant has initiated the first session:
continuing providing, to the first automated assistant, access to the one or more microphones;
discontinuing providing, to the second automated assistant, access to the one or more microphones; and
preventing the second automated assistant from accessing one or more portions of an output audio data stream provided for rendering via one or more speakers, the one or more portions including output audio data of the first automated assistant;
receiving, from the first automated assistant, an indication that the first session has ended; and
in response to receiving, from the first automated assistant, the indication that the first session has ended:
continuing providing, to the first automated assistant, access to the one or more microphones;
resuming providing, to the second automated assistant, access to the one or more microphones; and
resuming providing, to the second automated assistant, the output audio data stream, wherein the second automated assistant uses the output audio data stream in noise cancellation.

2. The method according to claim 1, wherein preventing the second automated assistant from accessing the one or more portions of the output audio data stream includes:
preventing the second automated assistant from accessing the output audio data stream while the first automated assistant is providing audible output during the first session.

3. The method according to claim 1, further comprising:
determining that a phone call has been initiated;
in response to determining that the phone call has been initiated, discontinuing providing, to the first automated assistant and to the second automated assistant, access to the one or more microphones;
determining that the phone call has ended; and
in response to determining that the phone call has ended, resuming providing, to the first automated assistant and to the second automated assistant, access to the one or more microphones.

4. The method according to claim 1, further comprising, subsequent to receiving, from the first automated assistant, the indication that the first automated assistant has initiated the first session, and prior to receiving, from the first automated assistant, the indication that the first session has ended:
identifying a notification, from the second automated assistant, to be output;
determining a priority of the notification; and
in response to the priority of the notification satisfying a threshold, prior to receiving, from the first automated assistant, the indication that the first session has ended, outputting the notification.

5. The method according to claim 4, further comprising:
buffering, in a buffer, the one or more portions of the output audio data stream that include the output audio data of the first automated assistant;
pausing presentation of the one or more portions of the output audio data stream that include the output audio data of the first automated assistant, while outputting the notification from the second automated assistant; and
after outputting the notification from the second automated assistant, resuming, from the buffer, presentation of the one or more portions of the output audio data stream that include the output audio data of the first automated assistant.

6. The method according to claim 1, further comprising, subsequent to receiving, from the first automated assistant, the indication that the first automated assistant has initiated the first session, and prior to receiving, from the first automated assistant, the indication that the first session has ended:
identifying a notification, from the second automated assistant, to be output;
determining a priority of the notification; and
in response to the priority of the notification not satisfying a threshold, suppressing the notification until receiving, from the first automated assistant, the indication that the first session has ended.

7. The method according to claim 6, further comprising:
buffering, in a buffer, the notification;
in response to receiving, from the first automated assistant, the indication that the first session has ended, outputting, from the buffer, the notification.

8. The method according to claim 1, further comprising:
receiving, via a graphical user interface, user interface input that is a request to initiate, on the second automated assistant, a second session;
in response to receiving the user interface input:
causing the second automated assistant to initiate the second session;
continuing providing, to the second automated assistant, access to the one or more microphones;
discontinuing providing, to the first automated assistant, access to the one or more microphones; and
preventing the first automated assistant from accessing output audio data of the second automated assistant.

9. The method according to claim 1, further comprising, subsequent to receiving, from the first automated assistant, the indication that the first automated assistant has initiated the first session, and prior to receiving, from the first automated assistant, the indication that the first session has ended:
displaying, on a graphical user interface, a visual indication that access to the one or more microphones is being provided to the first automated assistant.

10. The method according to claim 1, further comprising, subsequent to receiving, from the first automated assistant, the indication that the first automated assistant has initiated the first session:
providing an audible indication that access to the one or more microphones is being provided to the first automated assistant.

11. The method according to claim 1, further comprising, in response to receiving, from the first automated assistant, the indication that the first automated assistant has initiated the first session:
reassigning a physical button, that, upon activation, is configured to initiate a session of the second automated assistant, to instead initiate a session of the first automated assistant.

12. A computer program product comprising one or more computer-readable storage media having program instructions collectively stored on the one or more computer-readable storage media, the program instructions executable to:
receive, via one or more microphones, first audio data that captures a first spoken utterance of a user;
concurrently provide the first audio data to a first hotword detector of a first automated assistant and to a second hotword detector of a second automated assistant;
receive a first confidence score based on a probability, determined by the first hotword detector of the first automated assistant, of a first hotword being present in the first audio data, and a second confidence score based on a probability, determined by the second hotword detector of the second automated assistant, of a second hotword being present in the first audio data;
based on the first confidence score and the second confidence score:
provide, to the first automated assistant, second audio data, received via the one or more microphones, that captures a second spoken utterance of the user that follows the first spoken utterance of the user;
provide an indication that audio from the one or more microphones is being provided to the first automated assistant; and
prevent the second automated assistant from obtaining the second audio data.

13. The computer program product according to claim 12, wherein:
the first hotword detector processes the first audio data using one or more machine learning models of the first hotword detector to generate a first predicted output that indicates the probability of the first hotword being present in the first audio data; and
the second hotword detector processes the first audio data using one or more machine learning models of the second hotword detector to generate a second predicted output that indicates the probability of the second hotword being present in the first audio data.

14. The computer program product according to claim 12, wherein:
the first confidence score is higher than the second confidence score; and
the first confidence score satisfies a threshold.

15. The computer program product according to claim 12, wherein the indication that audio from the one or more microphones is being provided to the first automated assistant is a visual indication that is displayed on a graphical user interface, or an audible indication.

16. A system comprising:
a processor, a computer-readable memory, one or more computer-readable storage media, and program instructions collectively stored on the one or more computer-readable storage media, the program instructions executable to:
concurrently provide a first automated assistant and a second automated assistant with access to one or more microphones;
receive, from the first automated assistant, an indication that the first automated assistant has initiated a first session;

in response to receiving, from the first automated assistant, the indication that the first automated assistant has initiated the first session:
continue providing, to the first automated assistant, access to the one or more microphones;
discontinue providing, to the second automated assistant, access to the one or more microphones; and
prevent the second automated assistant from accessing one or more portions of an output audio data stream provided for rendering via one or more speakers, the one or more portions including output audio data of the first automated assistant;
receive, from the first automated assistant, an indication that the first session has ended; and
in response to receiving, from the first automated assistant, the indication that the first session has ended:
continue providing, to the first automated assistant, access to the one or more microphones;
resume providing, to the second automated assistant, access to the one or more microphones; and
resume providing, to the second automated assistant, the output audio data stream, wherein the second automated assistant uses the output audio data stream in noise cancellation.

17. The system according to claim 16, wherein preventing the second automated assistant from accessing the output audio data of the first automated assistant includes:
preventing the second automated assistant from accessing the output audio data based on determining that the first automated assistant is providing audible output.

18. The system according to claim 16, wherein the program instructions are further executable to:
determine that a phone call has been initiated;
in response to determining that the phone call has been initiated, discontinue providing, to the first automated assistant and to the second automated assistant, access to the one or more microphones;
determine that the phone call has ended; and
in response to determining that the phone call has ended, resume providing, to the first automated assistant and to the second automated assistant, access to the one or more microphones.

19. The system according to claim 16, wherein the program instructions are further executable to, subsequent to receiving, from the first automated assistant, the indication that the first automated assistant has initiated the first session, and prior to receiving, from the first automated assistant, the indication that the first session has ended:
identify a notification, from the second automated assistant, to be output;
determine a priority of the notification; and
in response to the priority of the notification satisfying a threshold, prior to receiving, from the first automated assistant, the indication that the first session has ended, output the notification.

20. The system according to claim 19, wherein the program instructions are further executable to:
buffer, in a buffer, the one or more portions of the output audio data stream that include the output audio data of the first automated assistant;
pause presentation of the one or more portions of the output audio data stream that include the output audio data of the first automated assistant while outputting the notification from the second automated assistant; and
after outputting the notification from the second automated assistant, resume, from the buffer, presentation of the one or more portions of the output audio data stream that include the output audio data of the first automated assistant.

* * * * *